US 6,614,917 B1

(12) United States Patent
Phillips

(10) Patent No.: US 6,614,917 B1
(45) Date of Patent: Sep. 2, 2003

(54) DYNAMIC PROCESS FOR IDENTIFYING OBJECTS IN MULTI-DIMENSIONAL DATA

(75) Inventor: Ronald William Phillips, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/426,558

(22) Filed: Oct. 22, 1999

(51) Int. Cl.$^7$ .............................. G06K 9/00; G06K 9/46; G06F 7/02
(52) U.S. Cl. .......................... 382/103; 382/190; 706/52
(58) Field of Search .................................. 382/103, 190, 382/191; 706/52, 900, 59

(56) References Cited

U.S. PATENT DOCUMENTS 5,640,468 A * 6/1997 Hsu ........................... 382/190
5,893,085 A * 4/1999 Phillips et al. ................. 706/50

FOREIGN PATENT DOCUMENTS

EP 0884603 A2 * 12/1998 ............. G01S/7/48

* cited by examiner

Primary Examiner—Amelia M. Au
Assistant Examiner—Martin Miller
(74) Attorney, Agent, or Firm—Williams, Morgan & Amerson, P.C.

(57) ABSTRACT

A method for identifying a detected object in multi-dimensional imagery data is disclosed. The method includes, (a) providing (1) a set of comparative feature values associated with one or more known objects in one or -more specified observation conditions and (2) a set of observation-related values including (i) a set of feature values for one or more features of an object as observed in an environment, (ii) a set of condition values for one or more conditions of the observation, including one or more of an orientation value, a depression value, a resolution value, and an obscuration value; and (b) generating one or more identification values for the object by comparing the set of feature values to the set of comparative feature values, including compensating for the set of condition values.

35 Claims, 10 Drawing Sheets

---

Modify a membership function according to one or more condition values

↓

Weigh the importance of one or more rules according to the confidence level in the extracted feature value

↓

Execute the fuzzy logic process to obtain an indication whether the segmented object corresponds to the potential identification Provide comparative feature values and observation-related values, including feature and condition values.

Generate identification values by comparing feature values to comparative feature values, including compensating for condition values

FIG. 1

Modify a membership function according to one or more condition values

Weigh the importance of one or more rules according to the confidence level in the extracted feature value Execute the fuzzy logic process to obtain an indication whether the segmented object corresponds to the potential identification

FIG. 3

DYNAMIC PROCESS FOR IDENTIFYING OBJECTS IN MULTI-DIMENSIONAL DATA

1. BACKGROUND OF THE INVENTION

1.1 Field of the Invention

The present invention pertains to identifying objects in three-dimensional imagery data and, more particularly, an automatic target recognition system employing a dynamic process to identify targets in LADAR data.

1.2 Description of the Prior Art

Automatic target recognition ("ATR") systems identify objects represented in multi-dimensional data to determine whether they are potential targets. Multi-dimensional data may be acquired in numerous ways. Laser detection and ranging ("LADAR") systems are commonly employed for this purpose. In such systems, a laser signal is transmitted from a platform and, upon encountering an object, is reflected back to the platform. The platform then processes the reflected signal to obtain multi-dimensional data regarding the object causing the reflection. This data captures a number of the object's features such as its height, length, width, average height, etc. Since the platform transmits many laser signals across a general area potentially containing a number of objects reflecting the signals, it is necessary for the ATR system to examine the data to determine which reflecting objects might be of interest.

ATR systems are often divided into four subsystems: detection, segmentation, feature extraction, and identification. Identification is the final process which takes inputs such as the aforementioned features and establishes an identity for the object based on comparisons to previously determined features of known objects. The accuracy of the identification depends on several factors including the accuracy of the object features used in the comparison and the number of known objects constituting potential identifications.

The ATR system would ideally be able to compare completely accurate feature measurements against those of all known objects to establish the unknown object's identity. However, identification is frequently hampered by poor measurements such that, even if one of the potential identifications is correct, a complete match cannot be recognized. For instance, a length measurement might be compromised if part of the unknown object is obscured by a wall or fence and a width measurement might be affected by the orientation of the object relative to the platform. ATR system design constraints for size and speed may also affect performance.

An ATR system must therefore, as a practical matter, quickly establish the best possible identity with available computing resources. However, conventional computing techniques are poorly suited to meet these design constraints. For instance, conventional computing resources classically analyze information in two states such as "yes" and "no", or "true" and "false" An incomplete match in the comparison phase of a suitable operational ATR system cannot easily be represented in two states and consequently requires extensive analysis to produce a useable answer. The extensive analysis, in turn, consumes time and computing resources. This consumption becomes more acute as the list of potential identifications becomes more comprehensive since there typically will be no or, at most, only a few complete matches. Conventional computational techniques are consequently poorly adapted to meet the various design constraints in practically implementing an ATR system and, as demand for improved system performance rises, become still less suited. Thus, there is a need for a new method for identifying objects in three-dimensional data which can dynamically account for conditions prevailing when the multi-dimensional data is collected.

One novel approach is presented in commonly owned U.S. Pat. No. 5,893,085, entitled "Dynamic Fuzzy Logic Process for Identifying Objects in Three Dimensional Data" Disclosed therein is a method of weighting the importance of particular feature comparisons and shifting particular feature membership functions based on the level of confidence in the accuracy of the feature measurement. This method is certainly a major improvement over prior art, but leaves room for improvement in the area of the adjustments made to the feature comparison process in view of not only confidence in the feature measurement itself, but in view of the conditions and circumstances prevailing at the time of the data collection which affect the expected range of values a known feature and the feature value should assume under similar conditions and circumstances.

2. SUMMARY OF THE INVENTION

The present invention in one embodiment is a method for identifying an object in observation-related data of an object in a surrounding environment. The method includes (a) providing (1) a set of comparative feature values associated with one or more known objects in one or more specified observation conditions and (2) a set of observation-related values including (i) a set of feature values for one or more features of an object as observed in an environment, (ii) a set of condition values for one or more conditions of the observation, including one or more of an orientation value, a depression value, a resolution value, and an obscuration value; and (b) generating one or more identification values for the object by comparing the set of feature values to the set of comparative feature values, including compensating for the set of condition values.

3. BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings:

FIG. 1 one is a flow diagram of one particular embodiment of a method for identifying an object from a set of three-dimensional data in accord with the invention;

FIG. 2 illustrates the collection of three-dimensional data in one particular embodiment of the invention;

FIG. 3 diagrams the task of comparing features extracted from a detected, segmented object with corresponding features from a potential identification in one particular embodiment of the invention;

FIG. 4 diagrams rule weighting as practiced in one particular embodiment of the invention;

FIG. 5A–5D illustrate concepts associated with some of the weight factors used in rule weighting in one particular embodiment of the invention;

FIGS. 6A–6F graphically illustrate the membership functions for the input variables in the fuzzy logic process;

4. DESCRIPTION OF ILLUSTRATIVE EMBODIMENTS

Figure 2:
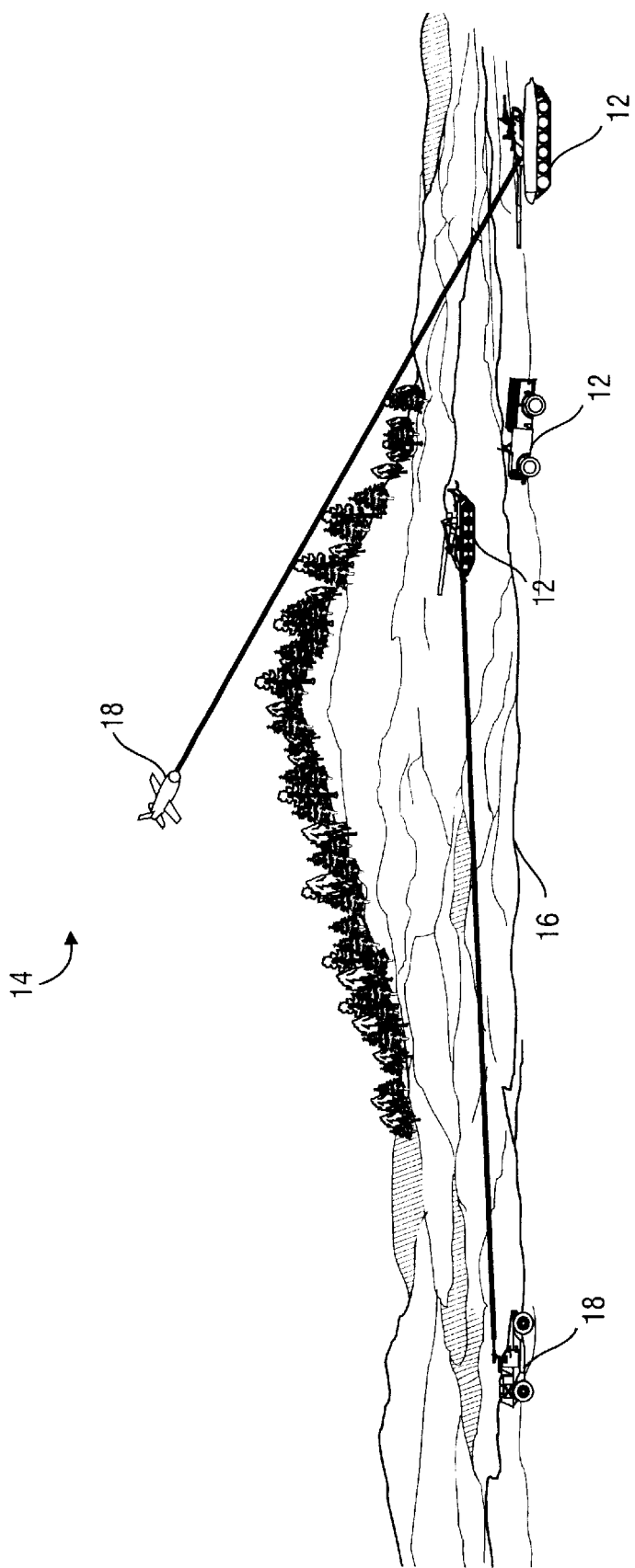

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. For instance, the invention is placed in the context of a complete ATR system including data acquisition and object detection to facilitate an understanding of the invention. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

4.1 An Overview of One Embodiment of the Invention

FIG. 1 is a flow diagram of one embodiment of a dynamic process for identifying an object as a potential identification for a set of multi-dimensional data. The embodiment in FIG. 1 generally presumes that: (a) acquiring multi-dimensional data from a scanned field of view, including an object within a surrounding environment; (b) detecting the object within the acquired data; (c) segmenting the detected object from the surrounding environment; and (d) extracting a feature value of the object, have previously been performed in any manner known to those in the art—as discussed more fully below in connection with FIG. 2.

The embodiment of FIG. 1 thus comprises providing one or more feature values and one or more condition values from multi-dimensional imagery data of an object in a surrounding environment along with one or more comparative feature values of known objects, and generating one or more identification values for the object by comparing one or more of the feature values to one or more of the comparative feature values, including compensating for one or more condition values. The compensation is employed to dynamically adjust the comparison by way of adjusting the comparative feature value or feature value or other parameters of the comparison by direct adjustment, lookup tables or otherwise, in accordance with the conditions and circumstances prevailing when the multi-dimensional data of the object in a surrounding environment was collected.

Alternatively, the feature value may be dynamically adjusted, or both the feature value and the corresponding feature may be adjusted to account for the prevailing conditions. This dynamic process of accounting for prevailing conditions may also include weighting the importance of particular feature comparisons according to a confidence level in the accuracy of the feature value.

The dynamic process outputs an indication of the likelihood that the object, per the result of one or more feature comparisons, corresponds to the potential identification. An object is identified from the likelihood indications of one or more object comparisons. Each of these steps is discussed in more detail below in connection with FIGS. 3–7.

4.2 Collecting Multi-dimensional Data

Referring now to FIG. 2, three-dimensional data regarding a scanned field of view, including an object 12 within a surrounding environment 14, can be collected for use in the embodiment of FIG. 1. The object 12 may be either airborne or, as shown, on the ground 16. Preferably, the data is laser detection and ranging ("LADAR") data collected from a platform 18 that is airborne, but platform 18 may also be on the ground 16. This LADAR data is generally acquired by scanning the field of view to generate rows and columns of discrete units of information known as "pixels"

The term "pixel" is derived from the phrase "picture element" A picture (i.e., an image) is a depiction or representation of a scene. Each pixel in the array of pixels which combine to create a picture represent a certain amount of space in the scene. The amount of space represented by each pixel directly affects the resolution of the pixel. The greater the area represented by a pixel, the lower its resolution.

Resolution is easily understood by reference to an everyday example. For a given scene, a digital camera with a zoom lens will be able to bring a subset of the scene closer than would a digital camera without a zoom lens. In the zoomed close-up digital picture, each pixel represents less space in the scene than does each pixel in the distant digital picture. Therefore, the close-up digital picture and its pixels have greater resolution of the scene than the distant digital picture and its pixels. In this way resolution is a product of the distance between the scene and the platform 18, taking into account any magnification ability of the platform 18.

Resolution is not only a function of distance, it is also a function of the number of pixels available to represent a scene. The fewer available pixels, the more area that must represented by each pixel. The number of available pixels is sometimes referred to as "pixel density."

The relation between pixel density and resolution is easily understood by considering the difference between the same digital camera with and without a wide angle lens . A wide angle lens causes a picture to display a larger scene, i.e., more area per pixel, than does the camera without a wide angle lens. In this way, resolution is a product of pixel density, taking into account any wide angle ability of the platform 18.

Distance and pixel density have a multiplicative affect on resolution. Thus, resolution can be succinctly described as the separation, angular separation, between each pixel multiplied by the effective range from the platform 18 to the scene object 12.

Pixels generate a two-dimensional "image" of the scanned field of view. However, the three-dimensional information, i.e. range, is retained and matched to appropriate pixels. Data acquisition, and particularly LADAR data acquisition is well known in the art and any suitable technique may be employed. Suitable techniques are disclosed and claimed in U.S. Pat. No. 5,200,606; 5,224,109; 5,285,461; and 5,701, 326, each of which is hereby expressly incorporated by reference herein for all purposes as if fully set forth verbatim.

4.3 Detecting an Object Within The Multi-dimensional Data

Once the multi-dimensional data containing an object 12 is acquired, the object 12 is detected from that data. Preferably, the object 12 is detected by examining the acquired data for indications of an identifying feature present in all potential identifications. Ascertaining what constitutes an "identifying feature" in this approach will necessarily depend on the potential identifications. It is possible that more than one identifying feature will be available. In some embodiments, it may be desirable to use more than one identifying feature to detect the object 12. Thus, the number of identifying features will necessarily depend on the particular embodiment implemented. The identifying feature from which the object 12 will be detected is preferably determined before the multi-dimensional data is acquired, but some embodiments may dynamically make this determination.

4.4 Segmenting A Detected Object & Extracting A Feature

The detected object 12 is segmented from the surrounding environment 14 within the scanned field of view. Preferably, segmentation is performed by identifying which pixels in the two-dimensional image represent the object 12, and then discarding all other pixels in the image of the scanned field of view. However, segmentation techniques are well known in the art and any suitable segmentation technique may be applied. One such suitable technique is disclosed and claimed in U.S. Pat. No. 5,644,386 which is hereby expressly incorporated by reference herein as if set forth verbatim.

Another technique involves determining from the three-dimensional data the relative spatial separation of the objects represented by adjacent pixels in the two-dimensional image. For instance, if a pixel represents part of the identifying feature of object 12 and if an adjacent pixel represents some surface that is less than a predetermined distance from the first pixel, then the two pixels are considered to represent different parts of the object 12 being segmented. Otherwise, the adjacent pixel is considered to represent some surface in the surrounding environment as opposed to the object 12 and is discarded.

After segmentation, at least one feature is extracted from the segmented object 12. In one particular embodiment, a value is ascertained for the extracted feature usually by measuring it from the three-dimensional data associated with the pixels of the segmented object 12. Feature extraction is known to the art and any suitable technique may be employed.

Object segmentation and feature extraction may be accomplished by employing the range to the object 12 rotated by the aspect angle and a mask indicating which pixels are target pixels (determined by detection and segmentation) for a minimum enclosing rectangular window around the object 12. The window contains all target pixels and a one pixel wide boundary around the target to determine the confidence level. Using the target pixel mask, boundary pixels are identified in a one pixel wide band around the object 12 by examining background pixels that are four-way adjacent to a given target.

The boundary pixels are then flagged based on their four-way position with respect to the target pixel (i.e. top, bottom, left, right). This border pixel identification procedure will return a border mask containing 4 bit flags per pixel denoting which pixels are border pixels and their position with respect to adjacent target pixels. The condition of obscuration(s) of the feature(s) of the object may be detected using the border pixel mask, the range rotated by the estimated angle, and the estimated minimum and maximum target dimensions in two dimensions, to identify obscuring pixels as a subset of the border pixels.

Obscuring pixels are border pixels for which (1) the range to a potentially obscuring pixel will be less than the range to at least one pixel that is adjacent to it as defined in the border pixel mask, and (2) the rotated coordinates lie beyond the minimum or maximum extents thereof. The pixels that meet this first criteria must also lie beyond the minimum or maximum extents of the rotated two dimensional range to be respectively length and width obscuring. A statistic giving a likelihood of target length or width obscuration may be defined as the ratio of the number of actual obscuring pixels in length, width as defined by the above criteria to the number of potential obscuring pixels in length, width. Such a ratio can then be used as the determination of the confidence in the associated length or width measurement.

4.5 Determining Confidence in the Extracted Feature Value

A determination may be made regarding the confidence level in the extracted feature. For instance, if there is a possibility that the side of the object 12 in FIG. 2 is at least partially obscured, then there may be little confidence that a length measurement is correct. These measurement errors typically do not arise from errant data collection, but more usually from obscuration of the object 12. The actual length of a vehicle partially located behind an obstacle such as a bush, fence, or wall, for example, will be greater than the measured length because the portion obscured by the obstacle will not be measured.

4.6 Determining Condition Values

In addition to one or more feature values being extracted, one or more condition values are calculated from the multi-dimensional data. These condition values represent one or more conditions prevailing at the time of the collection of the feature information within the multi-dimensional data. Conditions, though not so limited, include orientation or aspect angle, e.g. rotation, of the object 12 relative to the platform 18, depression angle to the object 12 relative to the platform 18, pixel resolution of the object and its features in the multi-dimensional data, and obscuration(s) of the feature (s) of object 12. Methods for determining each of these conditions is known in the art.

4.7 Details of One Embodiment of the Invention

Referring to FIG. 1, the aforementioned feature value(s) and condition value(s) are provided along with one or more comparative feature values associated with one or more specified objects in one or more specified observation conditions. The comparative feature values may reside in the form of an equation having observation condition variables, in lookup table format correlated to observation conditions, or in a mixture of lookup table and equation format. Regardless of the format of comparative feature values, condition values are utilized to modify, i.e., shift, reshape, or both, the value or range of comparative feature values. Comparative ranges are generally referred to as membership functions.

Alternatively, or in addition, condition values may be utilized to reshape or shift (offset) one or more feature values to account for confidence in measurement accuracy and/or prevailing conditions. The goal in accounting for conditions, regardless of which feature values or comparative feature values may be modified, is to prepare the best possible comparison between feature values and comparative feature values. Modifying the range or membership function of the comparative feature value, as opposed to simply shifting its range or function based on measurement confidence, allows the greatest flexibility in achieving the goal in view of all conditions.

Referring again to FIG. 1, one or more identification values for object 12 are generated by comparing the feature value of object 12 with a corresponding feature of a potential identification, i.e., a comparative feature value. The comparison includes accounting for condition values to prepare the best possible comparison. This may be concisely stated as correlation. Correlation adjusts or modifies the range or membership function in table lookup or equation form. Such a dynamic process of accounting for conditions may be carried out by a fuzzy logic process employing one or more rules.

Dynamic comparison employing the fuzzy logic process in one embodiment of the invention is illustrated more particularly in FIG. 3. Comparing the feature value may comprise modifying a membership function responsive to one or more condition values, weighting the importance of one or more rules based on confidence in the accuracy of the feature value, and executing the fuzzy logic process to obtain an indication of whether object 12 corresponds to the potential identification, per one or more feature comparisons.

Referring to FIG. 3, in the embodiment illustrated, at least one membership function is modified responsive to one or more conditions. In this dynamic fuzzy system, the capacity for dynamic behavior is achieved through rule weights and membership functions. Modifying a range of expected feature values, e.g., a membership function, is analogous to changing the definition of membership.

In general, fuzzy logic systems consist of: input variables, output variables, membership functions, and rules or propositions, i.e., equations, relating inputs to outputs through the membership functions. In one embodiment of the invention, the extracted feature value is the input variable, the indication of the likelihood that the extracted feature corresponds to a known object feature is the output variable, the membership function is a range of values for a known object feature (adjusted by prevailing condition values if necessary), and several rules (weighted by confidence in the accuracy of the extracted feature value if necessary) relate the extracted feature values to the membership functions to output a likelihood that the feature value corresponds to the expected feature value of the potential identification. The aggregation of all rules is the basis for the fuzzy logic inferencing process. The fuzzy logic process of the particular embodiment of the invention disclosed may utilize temporary variables defined as "weights" to weight the rules as described immediately below.

Figure 4:
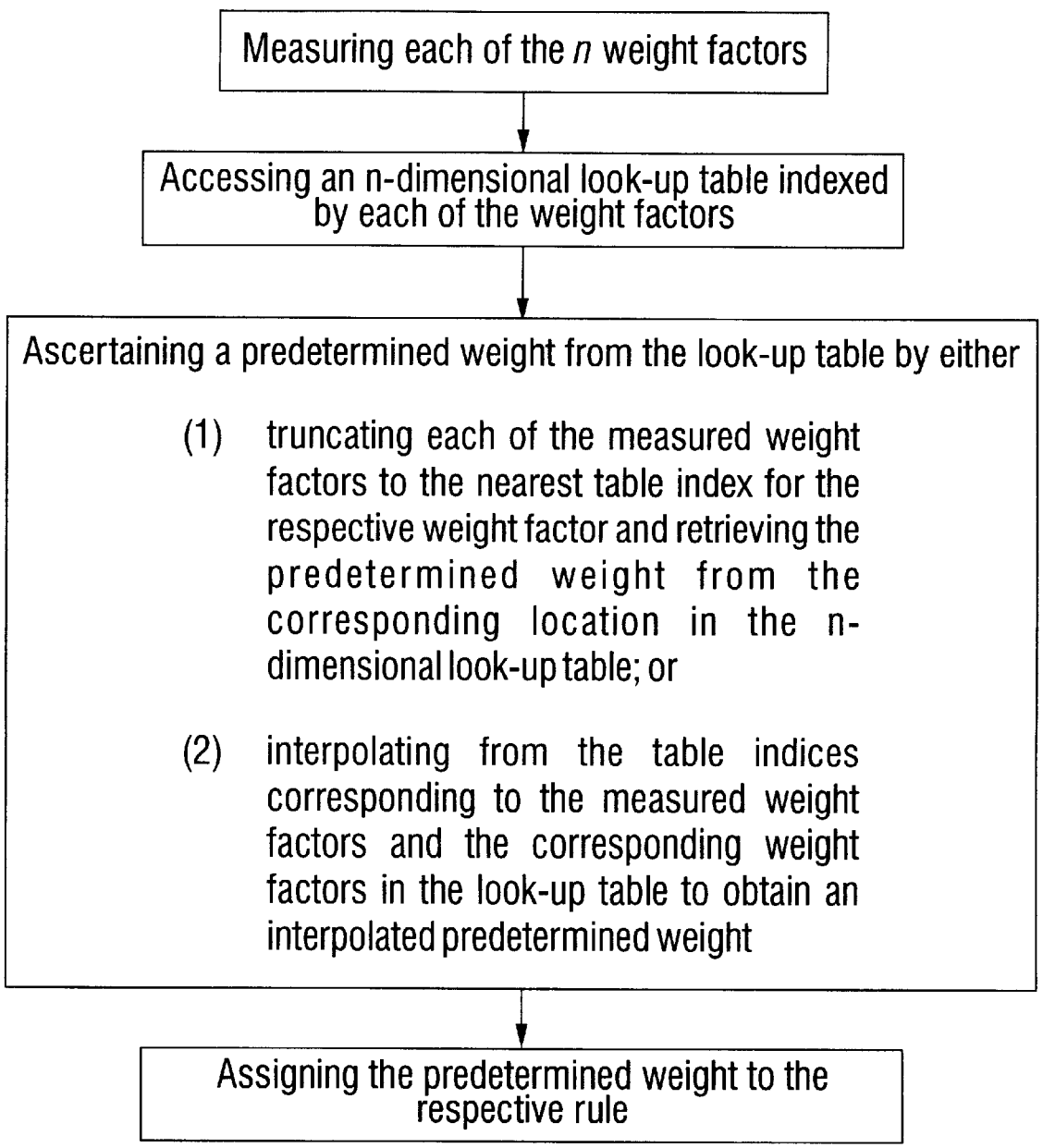

Weights are values assigned to rules that range from zero to one where a weight of zero effectively eliminates that rule's contribution to the inferencing process. Rules may be weighted according to the extracted feature value employed by the rule and according to n weight factors as is illustrated in FIG. 4. The predetermined weights may be derived by any manner known to the art, including calculations from models and educated deduction, and represent an understanding of the limitations associated with measuring a particular feature under certain circumstances. Thus, a fuzzy logic system inferencing process can be made dynamic over time by adjusting rule weights.

Weighting the rules in this particular embodiment generally includes measuring each of the n weight factors; accessing an n-dimensional look-up table indexed by each of the weight factors; and ascertaining a predetermined weight stored in the look-up table. The resolution of the indices must be traded with system resources and performance as will be appreciated by those of ordinary skill in the art having the benefit of this disclosure. For instance, indices having greater resolution will require a correspondingly larger memory to store all the values for the look-up table. On the other hand, lower resolution in some embodiments may require more processing although less memory. Still further, some indices might have better or poorer resolution in a given embodiment depending upon whether they generally indicate more or less reliability for an extracted feature.

Generally, a predetermined weight is ascertained from the table by either (1) truncating each of the measured weight factors to the nearest table index for the respective weight factor and retrieving the predetermined weight from the corresponding location in the n-dimensional look-up table, or (2) interpolating from the table indices to the weight factors to obtain an interpolated predetermined weight. One particular embodiment uses successive applications of a four-point La Grangian interpolation, but other techniques might be suitable depending on system design constraints size, speed, and accuracy. The predetermined weight is then assigned to the respective rule.

Referring again to FIG. 3, after membership functions and rules are adjusted, the extracted feature values are then finally compared to a potential identification by executing the fuzzy logic process in any suitable manner known to the art. The fuzzy logic process generally includes the subprocesses known as "fuzzification" "inference" "composition" and "defuzzification" Essentially and generally, "fuzzification" involves scaling the input variables, "inferencing" involves executing the rulebase, "composition" involves the aggregation of all of the rule consequents into the fuzzy output, and "defuzzification" typically involves the determination of a single crisp output (e.g., 0.85) from the fuzzy output. Each of these subprocesses can be performed in a variety of ways. The particular subprocesses employed in the fuzzy logic process is not material to the practice of the invention provided that there is a capability for modifying membership functions. Details of a particular fuzzy logic process can be found in commercially available, off-the-shelf software packages or any other fuzzy logic tool that may be known to those skilled in the art.

Indeed, there are numerous commercially available, off-the-shelf software packages that can be used to perform the necessary comparison, i.e., execution of the fuzzy logic process, perhaps with some modification. Among these are:

(1) "CubiCalc" available from Hyperlogic Corporation, 1855 East Valley Parkway, Suite 210, P.O. Box 300010, Escondido, Calif. 92039-0010; and (2) "MATLAB" with the add-in module "Fuzzy Logic Toolbox" available from The Math Works, Inc., 24 Prim Park Way, Natick, Mass. 01760.

However, a source-code license may be necessary from the copyright owners to access the source code for appropriate modifications necessary to implement the invention as described herein. For instance, one particular embodiment employs the CubiCalc package that stores membership functions as a series of arrays. To dynamically modify the membership function requires access to the internally stored arrays, but there is no such facility within the software package. Thus, the code source was needed and additional code was written to access and modify the arrays.

Referring to FIG. 3, indication of the likelihood of whether the segmented object 12 corresponds to a potential identification is output from the fuzzy logic process. This indication may be the likelihood itself or some other indication suitable to the particular implementation of the invention. In this particular embodiment the defuzzified output of the fuzzy logic process corresponds to the likelihood that the detected, segmented object 12 corresponds to the potential identification under consideration.

In the particular embodiment of the invention disclosed in FIGS. 1 and 3–4, the extracted features include the length, width, height, average height, and hull height of the object 12. As set forth above, the extracted features are variables in the fuzzy logic process. The variables utilized by the particular embodiment disclosed herein are set forth in Table 1.

TABLE 1

Fuzzy Logic System Variables

| Variable Name | Variable Definition | Variable Type | Initial (Default) Value |
|---|---|---|---|
| Length | extracted feature - measured length of the object | Input | 0.00000 |
| Chance | indication of possibility that the object corresponds to a particular potential identification | Output | 0.00000 |
| Width | extracted feature - measured width of the object | Input | 0.00000 |
| Height | extracted feature - measured height of the object | Input | 0.00000 |
| AvgHeight | calculated average height of the object | Input | 0.00000 |
| HullHeight | calculated height of the object's hull | Input | 0.00000 |
| WtLengthCor | weight predicated on the confidence in the measured length | Weight | 1.00000 |
| WtLengthUnd | weight predicated on whether the measured length may be under the range of expected values | Weight | 1.00000 |
| WtLengthOvr | weight predicated on whether the measured length may be over the range of expected values | Weight | 1.00000 |
| WtWidthCor | weight predicated on the confidence in the measured width | Weight | 1.00000 |
| WtWidthUnd | weight predicated on whether the measured width may be under the range of expected values | Weight | 1.00000 |
| WtWidthOvr | weight predicated on whether the measured width may be over the range of expected values | Weight | 1.00000 |
| WtHeightCor | weight predicated on the confidence in the measured height | Weight | 1.00000 |
| WtHeightUnd | weight predicated on whether the measured height may be under the range of expected values | Weight | 1.00000 |
| WtHeightOvr | weight predicated on whether the measured height may be over the range of expected values | Weight | 1.00000 |
| WtAvgHeightCor | weight predicated on the confidence in the calculated average height | Weight | 1.00000 |
| WtAvgHeightUnd | weight predicated on whether the calculated average height may be under the range of expected values | Weight | 1.00000 |
| WtAvgHeightOvr | weight predicated on whether the calculated average height may be over the range of expected values | Weight | 1.00000 |
| WtHullHeightCor | weight predicated on the confidence in the calculated hull height | Weight | 1.00000 |
| WtHullHeightUnd | weight predicated on whether the calculated hull height may be under the range of expected values | Weight | 1.00000 |
| WtHullHeightOvr | weight predicated on whether the calculated hull height may be over the range of expected values | Weight | 1.00000 |

Table 1 lists the system variables in alphabetical order for convenience and the ordering has no significance to the invention. Note that the extracted features, including Length, Width, Height, AverageHeight, and HullHeight in this embodiment, are inputs to the fuzzy logic process. The output variable Chance, is used in identifying the object 12 as one of a plurality of potential identifications as will subsequently be explained in greater detail.

Rule weights are determined and applied in the manner previously described. For each input variable in Table 1 there are corresponding weights for "over" "under" and "correct" although the scope of the invention is not so limited. For instance, for the input variable Length, there are weights called WtLengthCor, WtLenglhOvr, and WtLengthUnd. The weighted rules of the particular embodiment disclosed herein are set forth in Table 2 below.

TABLE 2

Weighted Rules (WtLengthCor) if Length is Correct then Chance is High
(WtLengthCor) if Length is Not Correct then Chance is Low
(WtLengthUnd) if Length is Under then Chance is Low
(WtLengthUnd) if Length is Very Under then Chance is ReallyLow
(WtLengthOvr) if Length is Over then Chance is Low
(WtLengthOvr) if Length is Very Over then Chance is ReallyLow
(WtWidthCor) if Width is Correct then Chance is High
(WtWidthCor) if Width is Not Correct then Chance is Low
(WtWidthUnd) if Width is Under then Chance is Low
(WtWidthUnd) if Width is Very Under then Chance is ReallyLow
(WtWidthOvr) if Width is Over then Chance is Low
(WtWidthOvr) if Width is Very Over then Chance is ReallyLow
(WtHeightCor) if Height is Correct then Chance is High
(WtHeightCor) if Height is Not Correct then Chance is Low
(WtHeightUnd) if Height is Under then Chance is Low
(WtHeightUnd) if Height is Very Under then Chance is ReallyLow
(WtHeightOvr) if Height is Over then Chance is Low
(WtHeightOvr) if Height is Very Over then Chance is ReallyLow
(WtAvgHeightCor) if AvgHeight is Correct then Chance is High
(WtAvgHeightCor) if AvgHeight is Not Correct then Chance is Low
(WtAvgHeightUnd) if AvgHeight is Under then Chance is Low TABLE 2-continued Weighted Rules (WtAvgHeightUnd) if AvgHeight is Very Under then Chance is ReallyLow
(WtAvgHeightOvr) if AvgHeight is Over then Chance is Low
(WtAvgHeightOvr) if AvgHeight is Very Over then Chance is ReallyLow
(WtHullHeightCor) if HullHeight is Correct then Chance is High
(WtHullHeightCor) if HullHeight is Not Correct then Chance is Low
(WtHullHeightUnd) if HullHeight is Under then Chance is Low
(WtHullHeightUnd) if HullHeight is Very Under then Chance is ReallyLow
(WtHullHeightOvr) if HullHeight is Over then Chance is Low
(WtHullHeightOvr) if HullHeight is Very Over then Chance is ReallyLow
if Length is Very Over or Width is Very Over or Height is Very Over or AvgHeight is Very Over or HullHeight is Very Over then Chance is ReallyLow Table 2 is the collection of rules used in the fuzzy logic system of the particular embodiment disclosed herein, although the invention is not so limited. Table 2 thus constitutes the system's "rulebase" or "knowledge base" Each quantity in parentheses is a weight, that may be changed from a default value of 1 as set forth below. The portion of each rule between the "if" and the "then" inclusive is the rule's "premise" or "antecedent" In the particular embodiment disclosed, there are six premises applied to each input variable. The portion of the rule following the "then" is the rule's "conclusion" or "consequent" The conclusion, or consequent of each rule actually assigns a membership function to the output value. In this particular embodiment, the conclusion assigns the value High, Low or ReallyLow to the variable Chance.

With the LADAR data of the particular embodiment described, it is beneficial to employ the dynamic mechanism represented by weighted rules. The benefits arise from knowledge of the circumstances under which the data was collected, which knowledge provides valuable insight with regard to which of many rules may presently be most appropriate. Inferences from weighted rules based on the "at present" susceptible information are diminished with rule weights varying from one (1.0) to zero (0.0). Thus, the criterion for identification is adjusted to take advantage of present circumstances. For example, if the depression angle from the sensor to the object is very shallow, and the view of the object is almost exclusively of the front or back, then under these circumstances estimating (measuring) the length of the object can be very difficult. That is, the estimate (measurement) of length may be very fragile or, alternatively, under these circumstances the length measurement derived from the LADAR data is not a robust feature. The weights lessen the influence of rules acting upon measurements known to be predicated on unreliable information. Conversely, the weights strengthen the influence of rules predicated on measurements known to be reliable. Thus, using rule weights to diminish inferences that rely on fragile information is a powerful mechanism for improving the identification process.

The embodiment illustrated utilizes three factors, though the invention is not so limited. The factors include the depression angle from the sensor aboard the platform 18 to the object 12 (both shown in FIG. 2), the object's orientation with respect to the sensor aboard platform 18, and the pixel resolution on the object 12. The first two of these factors are graphically illustrated in FIGS. 5A–5D from the vantage point of the airborne platform 18. FIGS. 5A–5D illustrate an object 12 from a 90°, 45°, 0°, and 0° depression angle, respectively, and a 30°, 30°, 30°, and 90° object aspect angle, respectively. For present purposes, the pixel resolution is the angular separation in radians between neighboring pixels multiplied by the range from the sensor aboard the platform 18. Thus, pixels separated by 0.005 radians at a range of 100 meters implies a pixel resolution of 0.50 meters. However, the scope of the invention is not limited to these particular factors. These factors were selected because it is known that they affect the accuracy, correctness, or reliability of measurements derived from the acquired data. Thus, in other contexts, other factors may be more desirable as more accurately reflecting the reliability of the extracted features and more or less than three factors might be employed.

In the particular embodiment illustrated, the three factors index a three-dimensional look-up table for all extracted features. Each table employs a resolution of five depression angles, five pixel resolutions, and eleven object aspect angles for a 275 entry index table. Each of the 275 indexed entries holds a predetermined weight for each feature (Length, Width, Height, AvgHeight, HullHeight) and a predetermined minimum expected value for each feature. Thus, each index references 10 predetermined values for a total of 2,750 predetermined values. Furthermore, there is such an n-dimensional lookup table for each potential target identification. The particular embodiment illustrated employs one such three-dimensional table for each of the input variables Length, Width, Height, AvgHeight and HullHeight for each potential identification. Other embodiments might employ as many as one n-dimensional table per extracted feature per potential identification.

Figure 5A:
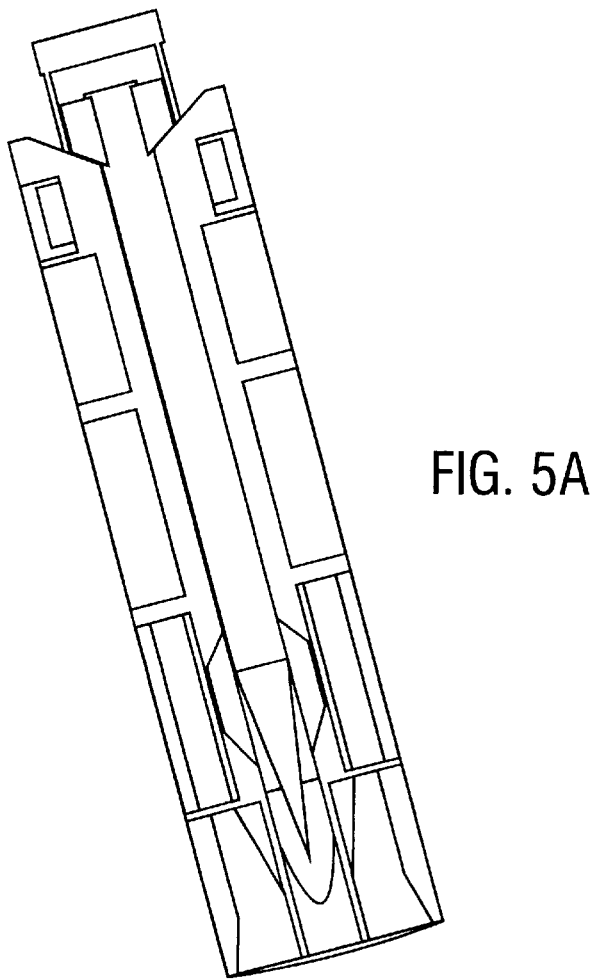
Figure 5B:
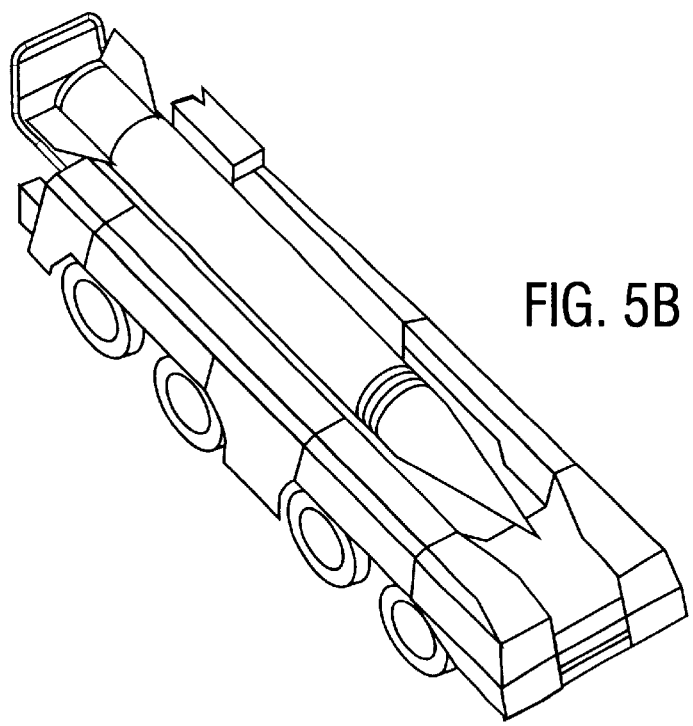
Figure 5C:
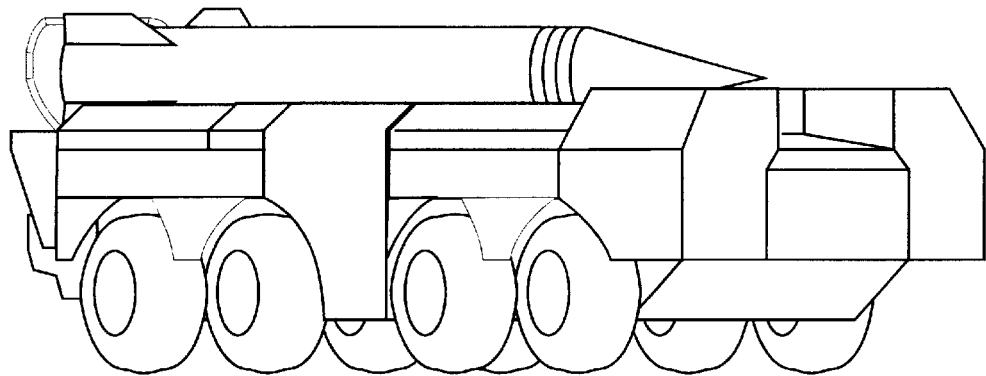
Figure 5D:
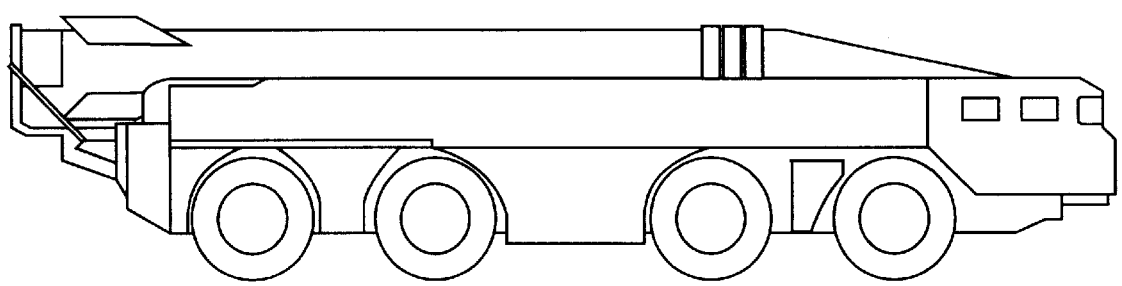

As noted earlier, predetermined weights range in value from 0.0 to 1.0 and may be derived by any manner known to the art, including calculations from models and educated deduction, and represent an understanding of the limitations associated with measuring a particular feature under certain circumstances. For example, FIGS. 5A–5C depict an object approximately 13 meters long and 3 meters wide. Assuming a pixel resolution of 0.50 meters or less, the weight factors from the view in FIG. 5A might yield a weight of 1.0 for rules employing length and width indicating a complete confidence in their reliability. In FIG. 5D, however, weights associated with rules relying the width factor might be 0.0, indicating a complete absence of confidence in the reliability of the width measurement.

The predetermined weight is then assigned to the respective rule. Reference to Table 2 shows that not every rule includes a weight indicated in parentheses. Such rules carry an implied weight of 1 and this may be true of other embodiments as well. However, it is generally desirable to weight the rules where possible to diminish the influence of unreliable features while bolstering the influence of reliable features. Thus, other embodiments might utilize rulebases in which all rules carry dynamic weights.

Contrast weighting rules with modifying membership functions. Rule weighting has an overriding effect on the indication of likelihood while modifying membership functions adjusts the actual comparison. Both weighting and modification can be based on any prevailing condition value, though the embodiment presents only one scenario.

Membership functions are modified according to one or more condition values. In the particular embodiment illustrated the depression angle from the sensor aboard the platform 18 to the object 12 is used, in addition to the other conditions, to index one or more separate lookup tables for all extracted features. This table provides information used to determine the expected range of values for each feature according to condition values. The feature value, or comparative feature value (or range of values), or both, are adjusted by utilizing the lookup table information indexed to the respective condition values.

In this embodiment the ranges are specified as follows: maximum, $97^{th}$ percentile, average, average deviation, $25^{th}$ percentile and $3^{rd}$ percentile. Other embodiments might employ a different method or representation for determining the expected range of values. Further, the scope of the invention is not limited to the use of lookup tables. Another embodiment (that perhaps has limited storage for data) might reference models that sufficiently approximate the desired values over the range of the n factor(s). Given a set of data points it is common to condense or summarize the data by fitting it to a model (e.g., mathematical equations) that depend on the n factor(s).

It is of little consequence to the invention whether the feature value or membership function is modified to account for conditions to generate an expected measured feature value or range of values or an expected known feature value or range of values. In other words, in a comparison of two values, either value or both can be adjusted to account for conditions and arrive at the same result. Thus, it only matters that the end result of a particular modification deliver the most accurate feature comparison, accounting for prevailing conditions. Such changes are encompassed by the terms "correlation" "modifying" "shaping" and "reshaping"

Thus, in addition to weighting the rules, deriving the expected feature value(s) occurs to ensure accurate and useful comparison results. In the particular embodiment illustrated, membership functions are modified rather than the measured feature value to account for prevailing conditions. There are three membership functions (also referred to as "adjectives" in fuzzy speak) for every fuzzy input variable—these are: Under, Correct, and Over. The default definitions of these membership functions is set forth in Table 3.

TABLE 3

Membership Function Definitions

| Variable | Membership Function | Defining Coordinates | |
|---|---|---|---|
| | | x Axis | y Axis |
| Length | Under | 0.0000 | 1.0000 |
| | | 10.180 | 1.0000 |
| | | 11.450 | 0.0000 |
| | | 16.000 | 0.0000 |
| | Correct | 0.0000 | 0.0000 |
| | | 8.7900 | 0.0000 |
| | | 12.450 | 0.9900 |
| | | 13.260 | 1.0000 |
| | | 15.130 | 0.0000 |
| | | 16.000 | 0.0000 |
| | Over | 0.0000 | 0.0000 |
| | | 14.590 | 0.0000 |
| | | 15.750 | 1.0000 |
| | | 16.000 | 1.0000 |
| Chance | Really Low | −0.250 | 1.0000 |
| | | 0.5000 | 0.0000 |
| | | 1.2500 | 0.0000 |
| | Low | −0.250 | 0.2000 |
| | | 0.5000 | 0.0000 |
| | | 1.2500 | 0.0000 |
| | High | −0.250 | 0.2000 |
| | | 0.5000 | 0.0000 |
| | | 1.2500 | 0.0000 |
| Width | Under | 0.0000 | 1.0000 |
| | | 1.9500 | 1.0000 |
| | | 2.2900 | 0.0000 |
| | | 6.0000 | 0.0000 |

TABLE 3-continued

Membership Function Definitions

| Variable | Membership Function | Defining Coordinates | |
|---|---|---|---|
| | | x Axis | y Axis |
| | Correct | 0.0000 | 0.0000 |
| | | 1.0000 | 0.0000 |
| | | 2.5700 | 0.8700 |
| | | 3.2000 | 1.0000 |
| | | 3.5600 | 0.0000 |
| | | 6.0000 | 0.0000 |
| | Over | 0.0000 | 0.0000 |
| | | 3.5200 | 0.0000 |
| | | 3.9700 | 1.0000 |
| | | 6.0000 | 1.0000 |
| Height | Under | 0.0000 | 1.0000 |
| | | 2.1400 | 1.0000 |
| | | 2.5200 | 0.0000 |
| | | 5.0000 | 0.0000 |
| | Correct | 0.0000 | 0.0000 |
| | | 2.6600 | 0.0000 |
| | | 2.8400 | 0.9700 |
| | | 3.2000 | 1.0000 |
| | | 3.5700 | 0.0000 |
| | | 5.0000 | 0.0000 |
| | Over | 0.0000 | 0.0000 |
| | | 3.4600 | 0.0000 |
| | | 3.8000 | 1.0000 |
| | | 5.0000 | 1.0000 |
| AvgHeight | Under | 0.0000 | 1.0000 |
| | | 1.2900 | 1.0000 |
| | | 1.6100 | 0.0000 |
| | | 5.0000 | 0.0000 |
| | Correct | 0.0000 | 0.0000 |
| | | 1.4200 | 0.0000 |
| | | 1.6800 | 0.8700 |
| | | 2.2200 | 1.0000 |
| | | 2.4400 | 0.0000 |
| | | 5.0000 | 0.0000 |
| | Over | 0.0000 | 0.0000 |
| | | 2.4000 | 0.0000 |
| | | 2.6400 | 1.0000 |
| | | 5.0000 | 1.0000 |
| Hull Height | Under | 0.0000 | 1.0000 |
| | | 1.4600 | 1.4600 |
| | | 1.8300 | 1.8300 |
| | | 5.0000 | 5.0000 |
| | Correct | 0.0000 | 0.0000 |
| | | 1.4700 | 0.0000 |
| | | 2.0600 | 0.8800 |
| | | 2.4500 | 1.0000 |
| | | 3.0300 | 0.0000 |
| | | 5.0000 | 0.0000 |
| | Over | 0.0000 | 0.0000 |
| | | 2.7300 | 0.0000 |
| | | 2.8700 | 1.0000 |
| | | 5.0000 | 1.0000 |

Figure 7A:
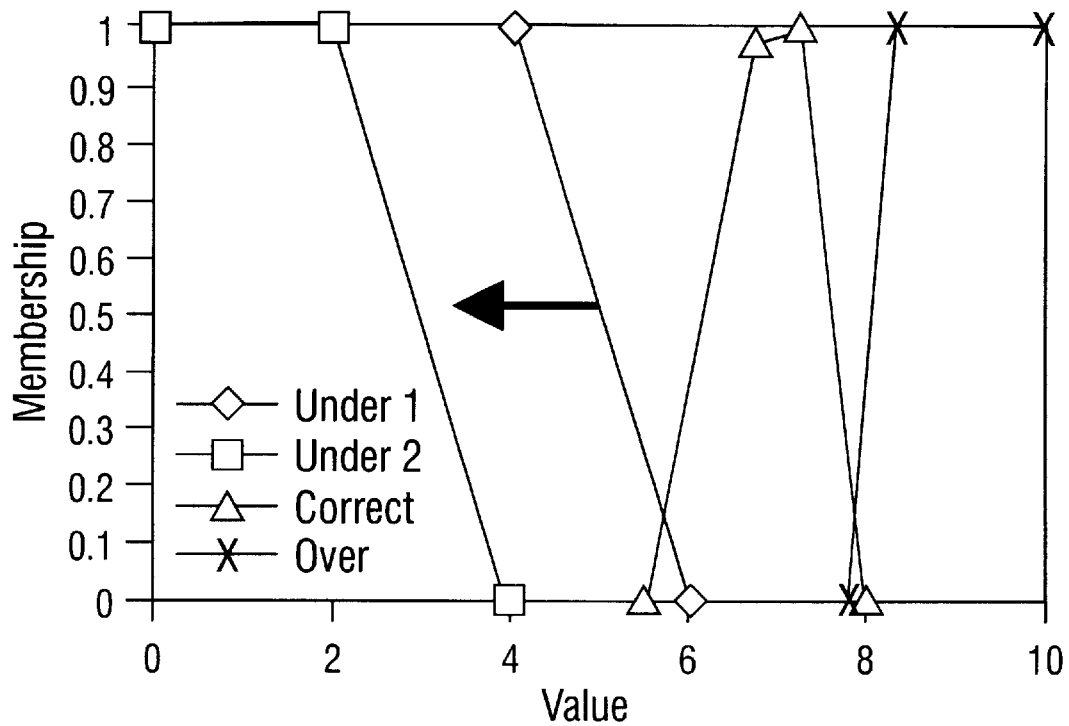
FIG. 7A illustrates shifting a membership function.

Suppose a set of circumstances in which the Length can be reliably measured but as a result of a cluttered environment the object may be partially obscured. In the illustration of FIG. 7A, the membership function Under has been shifted from "Under1" to "Under2." Consider the rule "if Length is Under then Chance is Bad" If Length has a value of 4 and Under is defined by "Under1" then the proposition "Length is Under" has a truth of one (1.0) and the membership function Bad is assigned to Chance with a truth of one (1.0). Assuming the same facts but with Under defined by "Under2," then the proposition "if Length is Under" has a truth of zero (0.0) and the membership function Bad is assigned to Chance with a truth of zero (0.0). Knowledge of the possibility for obscuration is therefore used to dynamically control the definition of Under. Note that, in this example, the membership function Bad is a penalty imposed when the value is not appropriate for the potential identification presently being evaluated.

This example shifts a membership function but preserves its shape. The particular Reembodiment is directed at tuning the adjustment by modifying the definition of the original membership function, wherein the term "modifying" stems from the recognition that regardless whether lookup tables or equations are used in the comparison process, there exists a default or initial value(s) where conditions are not yet accounted for. Thus, the criterion for identification is adjusted to account for existing conditions.

Suppose a set of circumstances in which Width can be measured consistently, e.g., no obstructions, but as a result of the positioning of the object this measurement is not the true width. For examples similar to that in FIG. 5D, width measurements may be consistent but not indicative of the true width. As noted earlier, the n-dimensional lookup table contains a minimum expected value for each feature. The Under membership function for the Width variable may be modified such that a significant penalty is not imposed if the measured Width exceeds the minimum width expected under the prevailing conditions, including positioning, for this object. In this case the weight WtWidthUnd could remain set at 1.0, leaving the rule enabled in the rulebase. If the measured width is less than the correct width but greater than the minimum expected width (accounting for prevailing conditions for this object) then one may conclude that the measurement may come from this object. This is not positive evidence for such a conclusion; but it warrants no substantial negative evidence. However, if the measured width is less than the expected minimum width then a significant penalty would be imposed because the rule weight for Under (WtWidthUnd) remains set at 1.0, indicating negative evidence that the measurement was derived from this object.

Figure 7B:
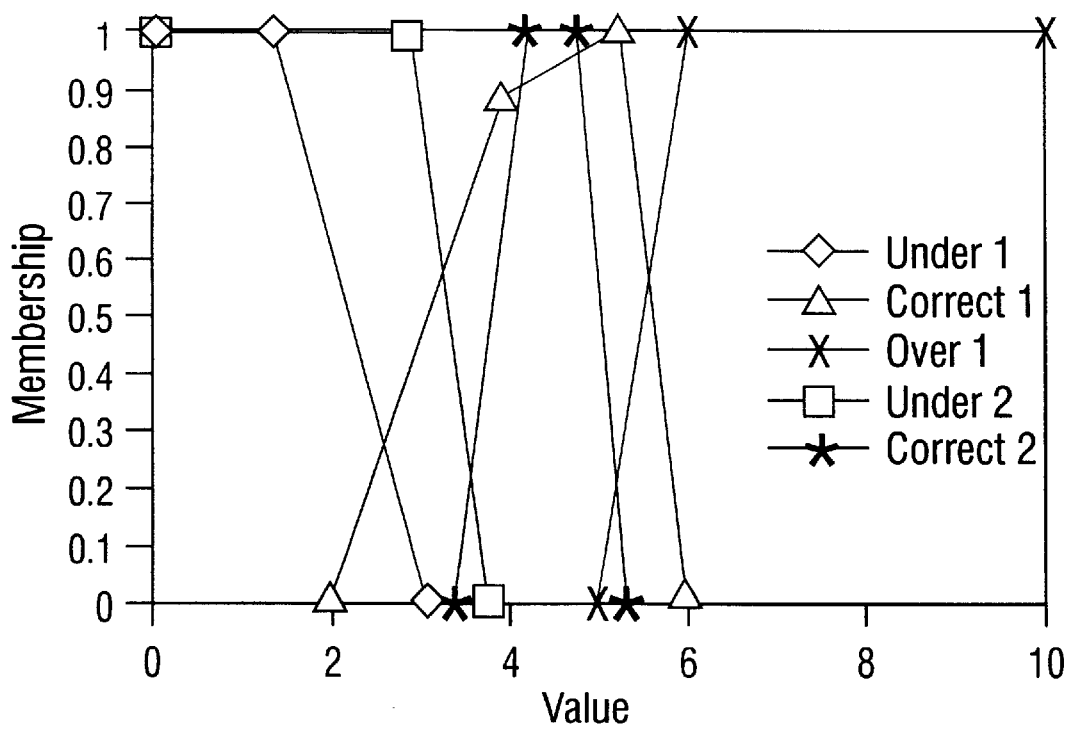
FIG. 7B illustrates reshaping a membership in accordance with one embodiment of the invention; land FIG. 8 diagrams one particular embodiment of the present invention alternative to that in FIG. 1.

FIG. 7B visually demonstrates modifying, i.e., reshaping, a membership function. The Correct2 membership function in FIG. 7B relative to the Correct1 membership function has been reshaped. It should be noted that shifting may coincide with reshaping. The boundaries of the membership function have increased or decreased in area or altered shape. This modification is contrasted with shifting the entire function where the function retains its shape. It should be noted that the modification shown in FIG. 7B is simply meant to be a visual depiction. The invention encompasses known feature values expressed in other than membership functions such as lookup tables. Whatever the form taken, each feature has a default wherein prevailing conditions are essentially not accounted for, such as length measured under perfect conditions.

Modifying a membership function is intended to adjust the feature comparison process. In FIG. 7B, Correct2 results in a sharper, i.e. crisper, definition of a feature match compared to Correct1. The conversion from Correct1 to Correct2 may be instigated, for example, by near perfect prevailing conditions such as a broadside measurement of object length with no obstructions and high pixel resolution. Thus, even though a high confidence in the measurement may exist (meaning that the rule weight should remain at 1), modifying the function is also done to provide a more focused comparison of the measured feature and known features.

Figure 6A:
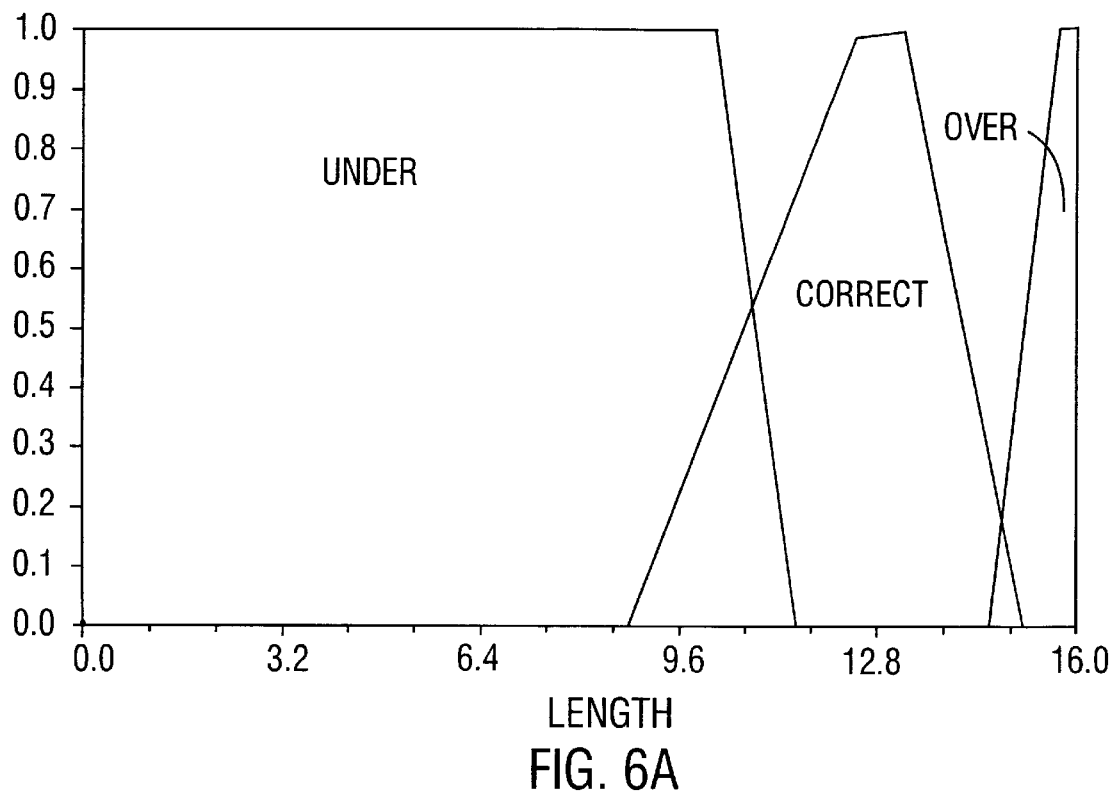
Figure 6B:
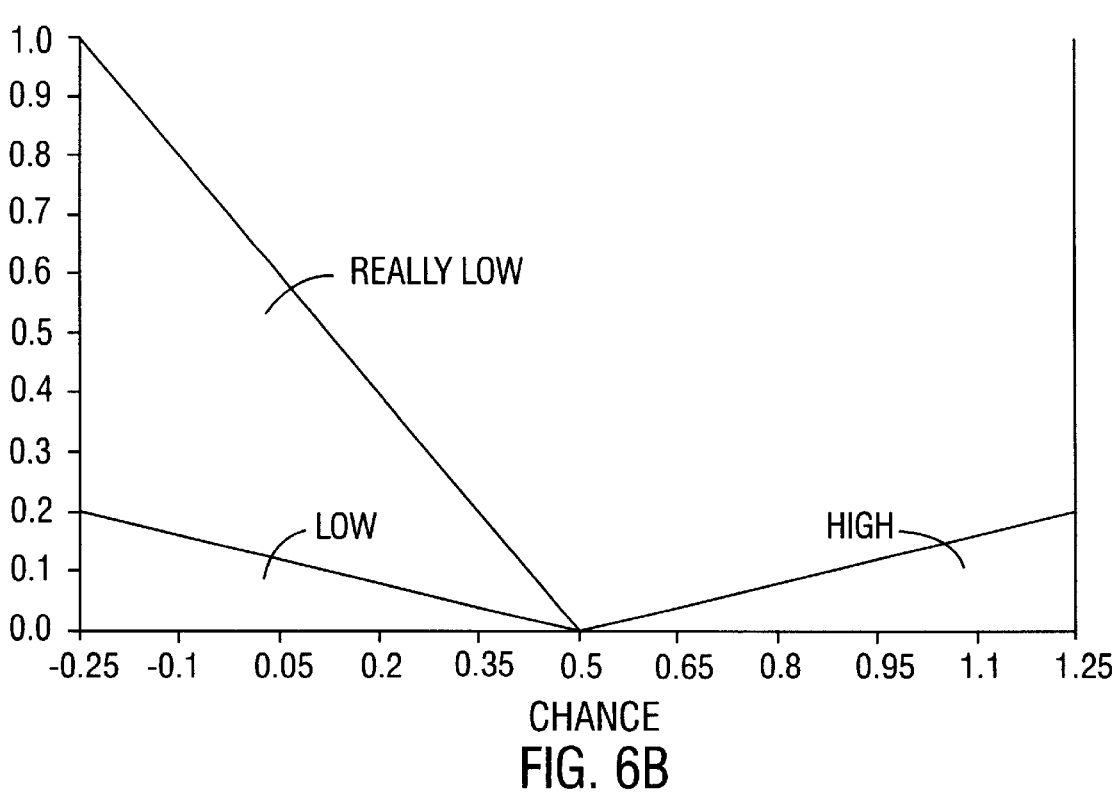
Figure 6C:
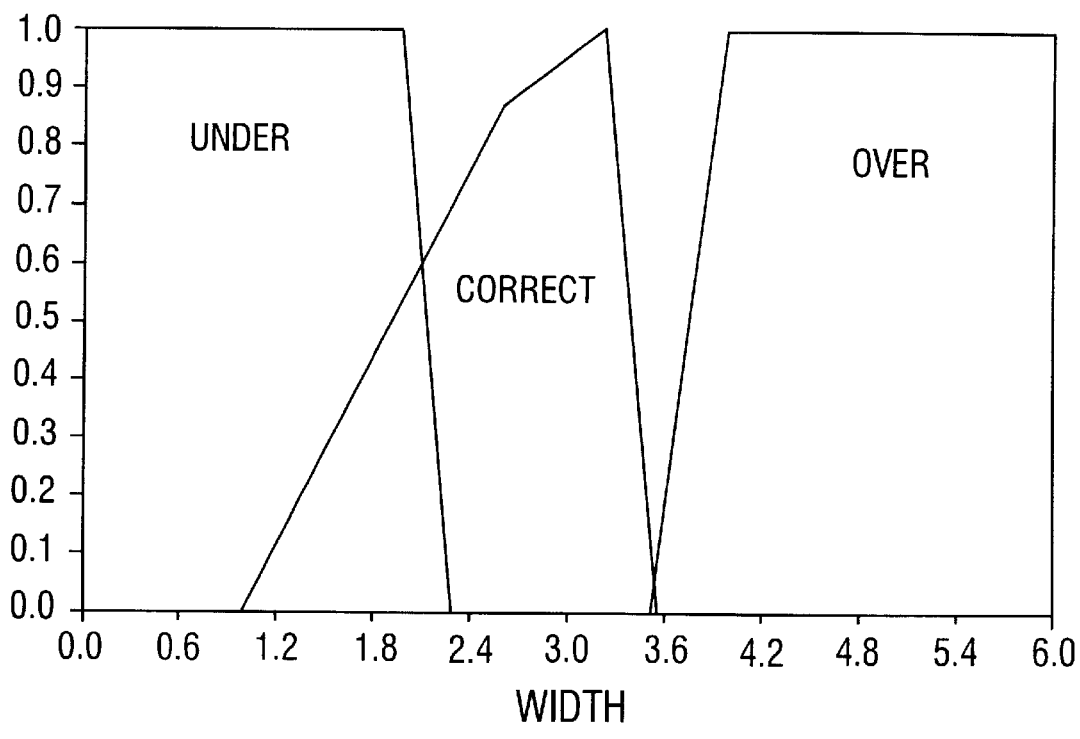
Figure 6D:
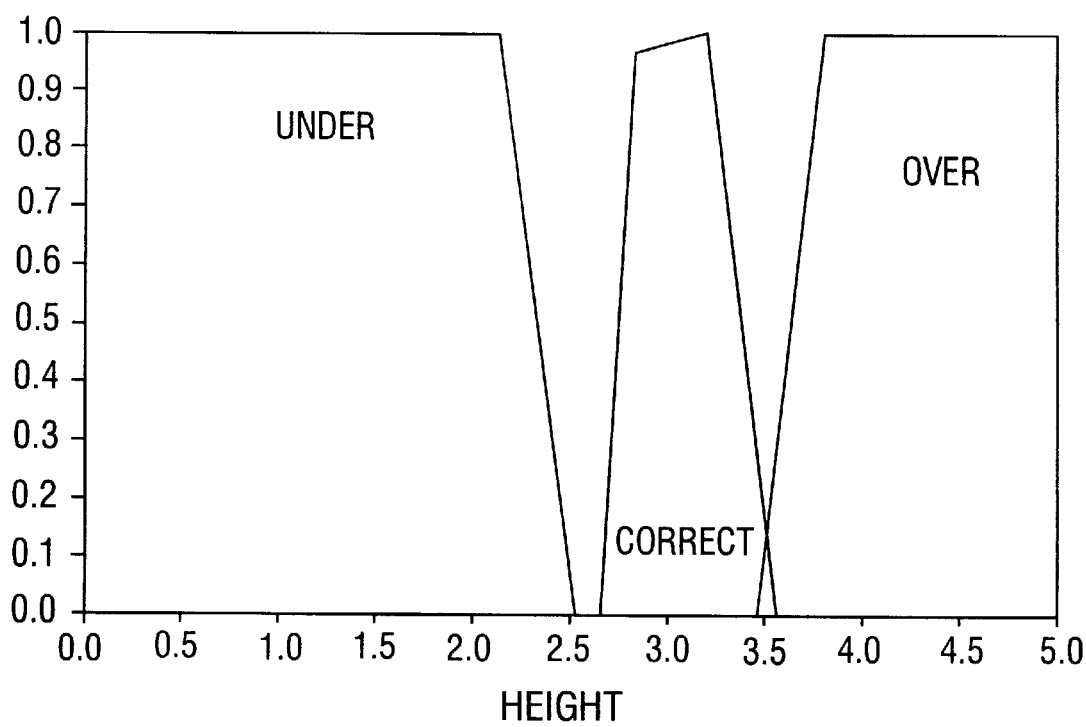
Figure 6E:
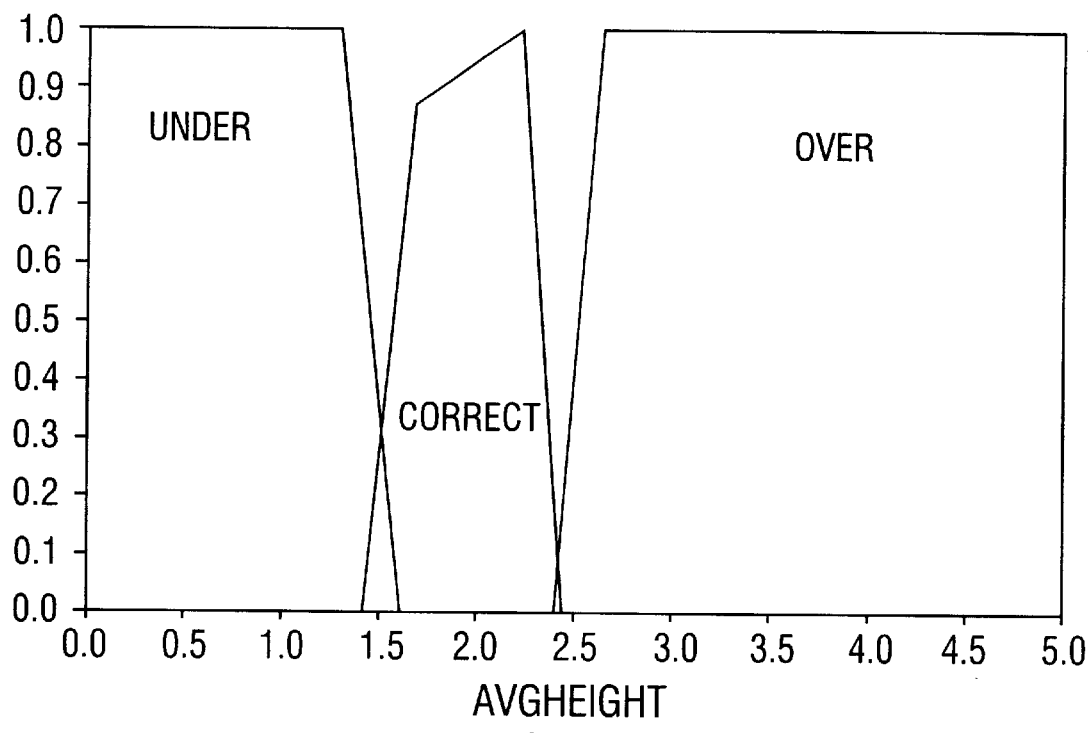
Figure 6F:
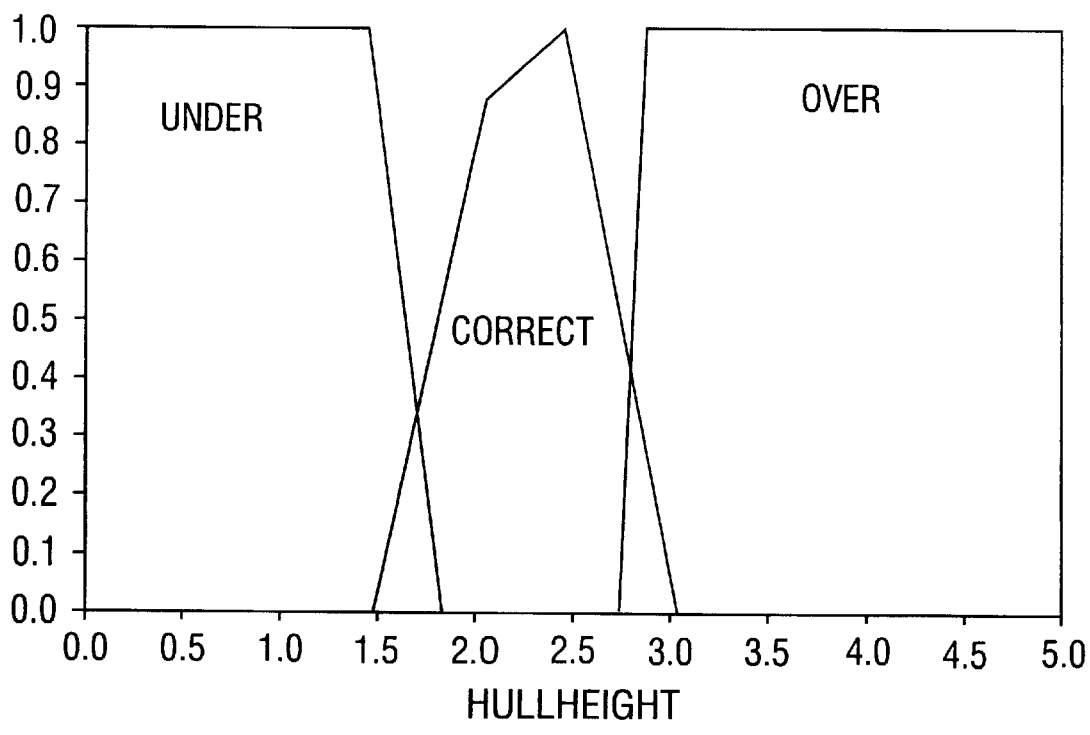
Figure 8:
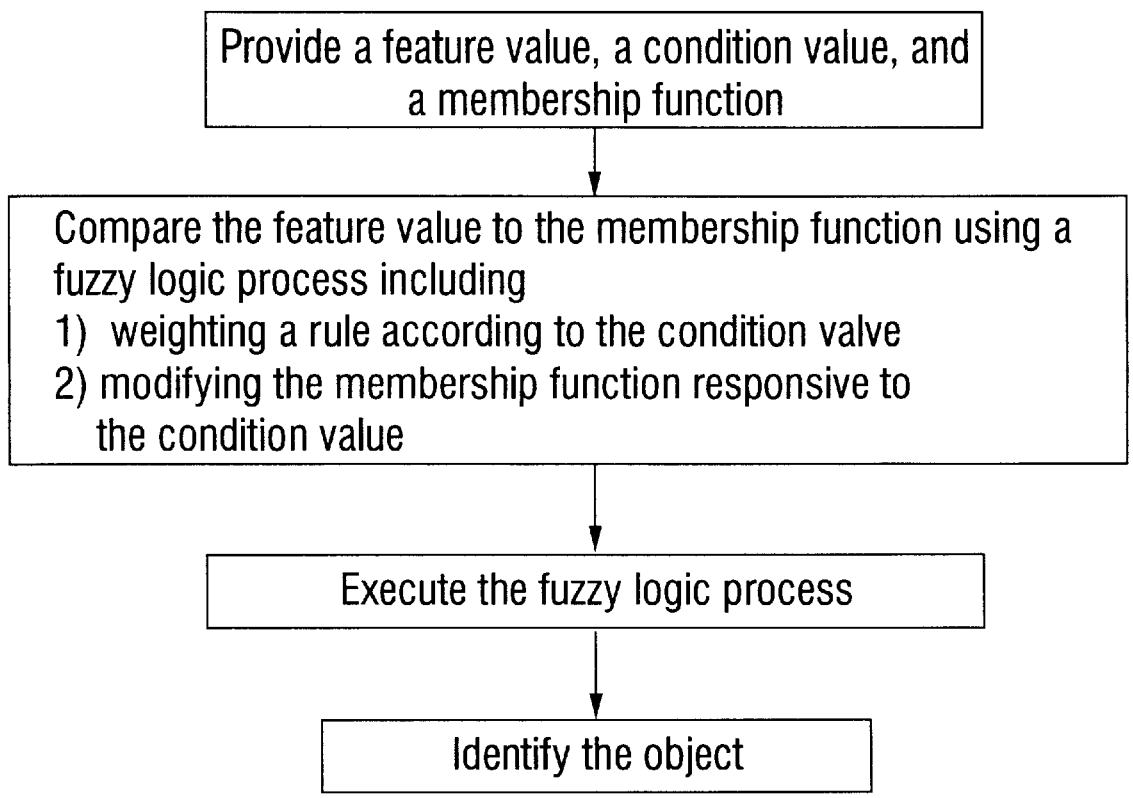

Referring to FIG. 8, following adjustments for prevailing conditions, the fuzzy logic process is then executed on the weighted rules with modified membership functions as set forth above to obtain a value of the output value Chance for each rule in the rulebase. Consider, for instance, the first listed rule in Table 2, the rule "(WtLengthCor) if Length is Correct then Chance is High" The membership functions for the fuzzy input variable Length are illustrated in FIG. 6A.

The inferencing process evaluates the rule. To the degree that Length is Correct and including the scaling factor associated with the present value of the rule weight WtLengthCor the output fuzzy variable Chance is assigned the membership function High (shown in FIG. 6B.) The inferencing process continues with all rules and rule weights in the rulebase. After all rules have been evaluated the individual outcomes of each rule inference are combined in the "composition" process to form the completed fuzzy output variable Chance. As a described above, "defuzzification" produces a single crisp output value (e.g., 0.85) from the fuzzy output variable. The single output is intended to represent the likelihood or possibility that the detected segmented object 12 (the source of measured feature values Length, Width, Height, AverageHeight, and HullHeight) corresponds to the potential identification represented by the membership function Correct.

In the particular embodiment disclosed in FIG. 8, the indication is the likelihood. It is the defuzzified output variable Chance in Table 1, Table 2, and in Table 3. The segmented object is evaluated against a plurality of potential identifications and the process of weighting rules, modifying membership functions, and comparing the object 12 is performed for each of the potential identifications. Thus, the process may yield a plurality of likelihood indications, one for each potential identification.

The object 12 is then identified from the output indications of likelihood in some embodiments of the invention. This identification may be performed in a number of ways depending on the particular implementation. For instance, the potential identification having the highest likelihood of match might be selected as the identification of the object 12. Alternatively, one might take a predetermined number of potential identifications having the highest likelihood of match and then select one through a process known to the art as three-dimensional model matching. Three-dimensional model matching is well known in the art and may preferably be employed where two or more potential identifications have approximately the same likelihood of match. In such situations, three-dimensional modeling may reliably distinguish among the most likely candidates. Regardless, the scope of the invention is not limited as to how the identification is made from the indications of likelihood.

Finally, in some embodiments, the identification of the object 12 is acted upon. This may entail any number of actions and even omissions. For instance, in the military application illustrated, the platform 18 in FIG. 2 may relay the information to a command post (not shown) where it is stored for future reference, the object 12 may be targeted and attacked, or the object 12 may simply be ignored. The particular act will depend upon the particular implementation and object identification and the invention is not limited in this respect.

Knowledge of the behavior of the LADAR sensor and the resulting multi-dimensional data has been assimilated to form the foundation and impetus for a new process for object identification using multi-dimensional data. The invention disclosed above applies this knowledge and uses several methods for invoking dynamic behavior in the identification process. Rule weights are adjusted to reflect a perceived robustness, i.e., confidence in accuracy, of a feature, whereas membership functions or other parameters are modified to reflect a change in allowable error for particular features.

The invention takes knowledge of the features' robustness and adapts the appropriate weight(s) in the fuzzy logic system. In one embodiment, the orientation of the object, the pixel resolution, and the depression angle from the LADAR sensor to the object, are used to influence inferencing in the fuzzy logic based identifier. In addition, knowledge of the circumstances needing broader or narrower tolerances are used to adapt the appropriate membership function(s) in the fuzzy logic system. In one embodiment, assessments of the potential obscurations and the expected value without the obscuration are used to influence inferencing in the fuzzy logic based identifier. The aforementioned conditions mainly affecting weighting or modification though may also affect the other, i.e., modification or weighting, respectively.

4.8 Program Storage Device

It will be apparent to those of ordinary skill having the benefit of this disclosure that any of the foregoing variations may be implemented by programming one or more suitable general-purpose processors in a LADAR detection system. (A common approach to implementation is likely to take the form of upgrading the software in an existing LADAR detection system.) The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code" i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

It can therefore be seen that the particular embodiments disclosed above are illustrative only as the invention may be modified and practiced in different but equivalent manners apparent to those skilled in the art having the benefit of the teachings herein. Furthermore, no limitations are intended to the details of construction or design herein shown other than as described in the claims below. It is therefore evident that the particular embodiments disclosed above may be altered or modified and all such variations are considered within the scope and spirit of the invention. For instance, some embodiments may modify membership functions before weighting rules even though no such particular embodiment is illustrated in the drawings. Accordingly, the protection sought herein is as set forth in the claims below.

What is claimed is:

1. A method for identifying an object in observation-related data of an object in a surrounding environment comprising:
   (a) providing:
      (1) a set of comparative feature values associated with one or more known objects in one or more specified observation conditions, the comparative feature values including one or more feature membership functions, and
      (2) a set of observation-related values including:
         (i) a set of observed feature values for one or more features of an object as observed in an environment, and
         (ii) a set of condition values for one or more conditions of the observation; and
   (b) generating one or more identification values for the observed object by comparing the set of observed feature values to the set of comparative feature values, including compensating for the set of condition values by reshaping at least one of the feature membership functions.

2. The method of claim 1, wherein compensating for the set of condition values includes modifying at least one feature value to an expected value to compensate for the obscuration value.

3. The method of claim 1, wherein the compensation correlates the comparative feature values to the set of condition values.

4. The method of claim 1, wherein the compensation modifies the set of feature values to a set of expected feature values.

5. The method of claim 4, wherein the expected feature values comprise a range of values.

6. The method of claim 1, wherein generating one or more identification values further includes establishing a confidence in the accuracy of one or more of the feature values in view of one or more of the condition values and weighting the importance of the comparison based on the confidence.

7. The method of claim 1, wherein generating one or more identification values includes executing a fuzzy logic process that utilizes one or more membership functions.

8. The method of claim 1, wherein the observation-related data includes three dimensional LADAR pixel data.

9. The method of claim 1, wherein the condition values include at least one of an orientation value, a depression value, a resolution value, and an obscuration value.

10. A method for identifying an object in multi-dimensional imagery data comprising:
    (a) providing multi-dimensional imagery data, including (1) a feature value of an object, (2) a condition value, (3) a feature membership function for a potential identification; and
    (b) comparing the feature value to the feature membership unction to identify the object, including compensating for the condition value by modifying either or both the feature value and feature membership function, wherein modifying the feature membership function includes reshaping the feature membership function.

11. The method of claim 10, wherein the compensation includes establishing comparative feature values in view of one or more condition values and modifying the feature membership function based on these comparative feature values.

12. The method of claim 10, wherein the compensation includes establishing a confidence in the accuracy of the feature value in view of one or more condition values and weighting the importance of the comparison based on the confidence.

13. The method of claim 10, wherein the compensation includes executing a fuzzy logic process utilizing the modified feature membership function.

14. The method of claim 10, wherein, the multi-dimensional imagery data includes three dimensional LADAR pixel data.

15. A method for identifying an object in multi-dimensional imagery data comprising:
    (a) providing multi-dimensional imagery data, including (1) a feature value of an object, (2) a condition value, (3) a feature membership function for a potential identification;
    (b) reshaping the feature membership function to compensate for the condition value; and
    (c) comparing the feature value to the reshaped feature membership function to identify the object, including selecting the feature membership parameters based on the condition value.

16. The method of claim 15, wherein comparing the feature value to the feature membership function to identify the object further includes weighting the importance of the comparison based on the condition value.

17. The method of claim 15, wherein comparing the feature value to the feature membership function to identify the object further includes executing a fuzzy logic process utilizing the feature membership parameters.

18. The method of claim 15, wherein the multi-dimensional imagery data includes three dimensional LADAR pixel data.

19. A method employing fuzzy logic for identifying an object in LADAR data, the method comprising:
   (a) providing:
      (1) feature value of the object,
      (2) a condition value, and
      (3) a membership function for a corresponding feature of a potential identification;
   (b) reshaping the membership function to compensate for the condition value;
   (c) comparing the feature value to the reshaped membership function using a fuzzy logic process, the comparison including:
      (1) weighting at least one rule in a rulebase according to the condition value; and
      (2) modifying the membership function responsive to the condition value;
   (d) executing the fuzzy logic process to obtain an indication of whether the object corresponds to the potential identification; and
   (e) identifying the object responsive to the indication.

20. The method of claim 19, wherein the condition value is one of an object orientation value, a depression value, a resolution value, and an obscuration value.

21. A method for identifying an object in observation-related data of an object in a surrounding environment comprising:
   providing:
      a set of comparative feature values associated with at least one known object in at least one specified observation condition, and
      a set of observation-related values including:
         a set of observed feature values for at least one feature of an observed object in an environment, and
         a set of condition values for at least one condition of the observation; and
   reshaping a fuzzy logic membership function for at least one of the comparative feature values responsive to at least one condition value.

22. The method of claim 21, wherein the set of condition values includes at least one of an orientation value, a resolution value, and an obscuration value.

23. The method of claim 21, wherein the comparative feature values comprise a range of values.

24. The method of claim 21, further comprising generating at least one identification value for the observed object from the observed feature values, the observed feature values including the modified observed feature value.

25. The method of claim 24, wherein generating the identification value includes a comparing the set of observed feature values to the comparative feature values.

26. The method of claim 24, wherein generating the identification value includes executing a fuzzy logic process.

27. The method of claim 26, further comprising shifting the membership function for a corresponding one of the comparative feature values.

28. The method of claim 24, wherein generating the identification value includes: establishing a confidence in the accuracy of at least one of the observed feature values in
   view of at least one of the condition values; and
   weighting the importance of the comparison based on the confidence.

29. The method of claim 21, wherein the observation-related data includes three dimensional LADAR pixel data.

30. A method for identifying an observed object in multi-dimensional imagery data comprising:
   (a) providing multi-dimensional imagery data, including:
      (1) an observed feature value of an object;
      (2) a condition value; and
      (3) a feature membership function for a potential identification;
   (b) compensating for the condition value by reshaping the feature membership function; and
   (c) comparing the observed feature value to the reshaped feature membership unction to identify the observed object.

31. The method of claim 30, wherein the compensation includes:
   (i) establishing a plurality of comparative feature values in view of at least one condition value; and
   (ii) modifying the feature membership, function based on the comparative feature values.

32. The method of claim 30, wherein the compensation includes:
   (i) establishing a confidence in the accuracy of the observed feature value in view of at least one condition value; and
   (ii) weighting the comparison based on the confidence.

33. The method of claim 30, wherein the compensation includes executing a process utilizing the modified feature membership function.

34. The method of claim 30, wherein the multi-dimensional imagery data includes three dimensional LADAR pixel data.

35. A program storage device encoded with computer readable instructions for performing the operations recited in a specified one of claims 1 through 19 and claims 20–21.

* * * * *